Figure 1:
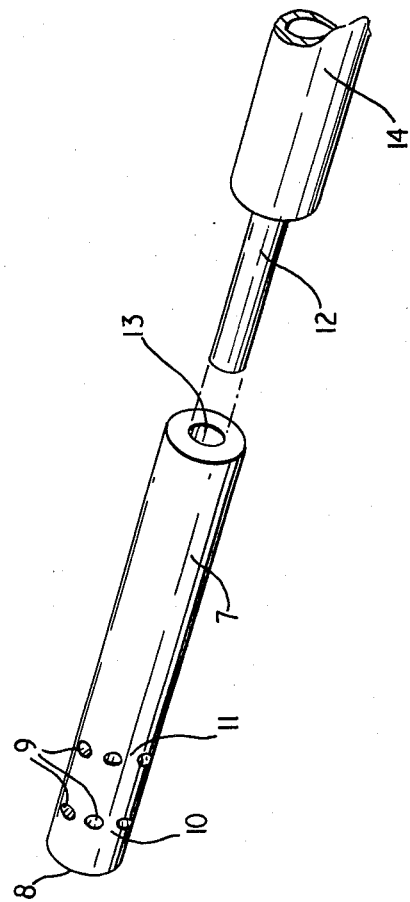
Figure 1:
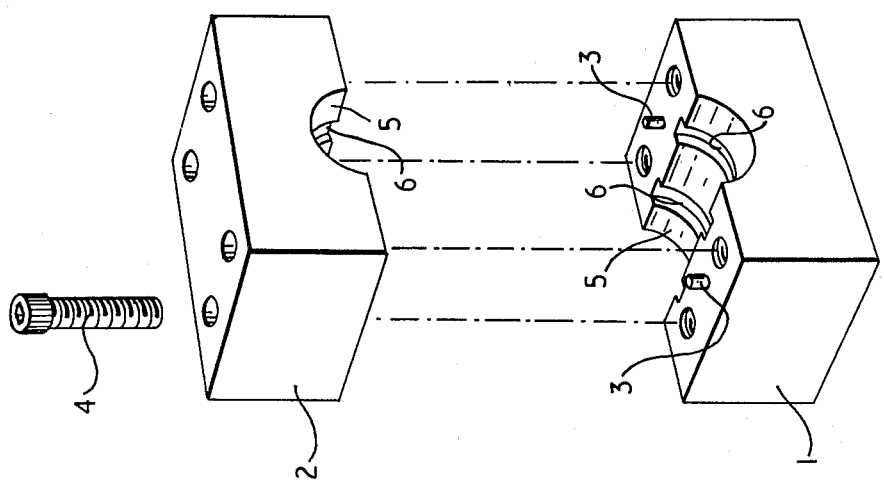

United States Patent [19]

Irons

[11] 4,392,292
[45] Jul. 12, 1983

[54] FORMING PROCESS
[75] Inventor: Ian B. Irons, Reading, England
[73] Assignee: Johnson, Matthey & Co., Limited, London, England
[21] Appl. No.: 156,853
[22] Filed: Jun. 5, 1980
[30] Foreign Application Priority Data Jun. 6, 1979 [GB] United Kingdom ................. 7919705
Jul. 19, 1979 [GB] United Kingdom ............... 79/25205

[51] Int. Cl.³ ....................... B21D 26/02; B23P 17/00
[52] U.S. Cl. .................................... 29/421 R; 72/58; 72/61
[58] Field of Search ................. 72/59, 61, 62, 58, 370, 72/268; 29/157 T, 237, 421 R, 523

[56] References Cited
U.S. PATENT DOCUMENTS

| 588,804 | 8/1897 | Parish | 72/61 |
|---|---|---|---|
| 616,764 | 12/1898 | Bourke | 72/59 |
| 1,879,663 | 9/1932 | Dreyer | 72/62 |
| 2,027,285 | 1/1936 | Parker | 29/157 T |
| 2,975,510 | 3/1961 | Heuss et al. | 29/157 T |
| 3,095,973 | 7/1963 | Buigne | 72/268 X |
| 3,130,771 | 4/1964 | Peyton | 72/59 |
| 3,287,949 | 11/1966 | Skinner | 72/62 |
| 3,432,887 | 3/1969 | Poux et al. | 425/409 X |
| 3,885,298 | 5/1975 | Pogonowski | 29/523 X |
| 4,109,365 | 8/1978 | Tygart | 29/421 R |

FOREIGN PATENT DOCUMENTS 1270672 4/1972 United Kingdom ................... 72/59

Primary Examiner—Ervin M. Combs
Attorney, Agent, or Firm—Cushman, Darby & Cushman

[57] ABSTRACT

A method and apparatus for production of couplings for joining together sections of metal tubing, the couplings being of the type comprising sockets having e.g. an annular recess carrying a filler metal, whereby the filler metal comprises a plastic composition which is applied under pressure to a selected internal area of a section of deformable tubing, thereby to form an indentation containing a deposit of plastic composition.

6 Claims, 5 Drawing Figures

FORMING PROCESS

This invention relates to means for the production of couplings for joining together, by brazing or by soldering, sections of metal tubing.

Sections of metal tubing are frequently joined together by soldering or brazing in which, generally, metal joining means, commonly known in the art as fittings, unions or couplings and referred to throughout the remainder of this specification as "couplings," are utilised comprising two or more sockets, each socket being adapted to receive with marginal clearance an end portion of a section of tubing and carrying in an annular groove or recess around its inner surface a filler metal such as a brazing alloy or a soldering alloy. In use, and on insertion of an end portion of tubing and heating the coupling and the said end portion, molten filler metal flows by capillary action between the inner surface of the socket and the outer surface of the tubing (the "jointing surfaces") to effect, on cooling, a strong and durable joint.

In a simple embodiment a coupling may be intended for joining two sections of tubing substantially co-axially, both sections of tubing having the same nominal external diameter. More complex couplings may involve the use of bends or elbows and/or reducing bores and/or means for joining more than two sections of tubing, such means taking the form of a tee, cross of a "Y" piece, for example.

Our co-pending British patent application No. 7912139 describes an improved coupling comprising two or more sockets, wherein each socket has one or more grooves or recesses formed in its inner surface and each groove or recess carries a deposit comprising a thermoplastic filler metal material. Such couplings are generally made by a multi-stage procedure comprising rolling and/or machining a blank (that is, devoid of brazing or soldering material) coupling and then inserting into each groove or recess thermoplastic filler metal material by extrusion moulding, for example.

We have now found that couplings made of ductile metal and of the type described in our said co-pending British patent application, or at least individual sockets thereof, may be made from sections of ductile metal tubing in an essentially single-stage operation.

According to one aspect of the present invention, a method of producing an indentation opening into an internal wall surface of a tubular body made from a deformable material comprises, supporting with at least one support member at least that region of the external surface of the tubular body bounding an area within which the indentation is to be formed, and applying pressure to an area of the internal wall surface where the indentation is required so as to deform the wall and thereby produce the indentation, the pressure being applied via a plastic medium which remains within the indentation when application of pressure is terminated.

According to a second aspect of the invention, a method of producing an indentation opening into an internal wall surface of a tubular body made from a deformable material comprises, supporting with a support member the external surface of the tubular body at least in that region thereof backing onto the region where it is desired to form the indentation, the support member having a shape conforming to the external shape of the region of the tubular body and having a cavity which reflects the general shape and size of the indentation, and applying pressure to that area of the internal wall surface where the indentation is to be located so as to deform the same into conforming with the shape and size of the cavity, the pressure being applied via a plastic medium which remains within the indentation when application of pressure is terminated. By plastic we mean deformable under pressure but not fluid at ambient temperatures. We prefer to use a thermoplastic medium which in addition to the above properties is fluid at elevated temperatures and throughout the remainder of this specification and claims the term "plastic" is to be understood as embracing such a medium.

The indentation may extend circumferentially, axially or obliquely relative to an axis of symmetry of the tubular body. Moreover, the indentation may be endless or continuous, that is extend around the entire internal circumference of the tubular body. If desired, however, a plurality of discrete indentations may be produced substantially small enough at intervals around or along the internal wall of the body. The pressure may be applied to the plastic medium by a fluid pressure system or by a mechanical system. Conveniently, the plastic medium includes metallic or non-metallic fillers and/or extenders. Where the method is used to manufacture couplings as mentioned previously, the body is, preferably, made from a ductile metal such as copper. However, permanently deformable plastics and other materials may also be deformed in accordance with the method of the present invention.

Where the indentation is in the form of an annular groove extending completely around the internal periphery of the tubular body, the support member may comprise two tubular elements each having a diameter which snugly receives the tubular body. In such a case, the two tubular elements are located on the tubular body at an axial distance apart which is commensurate with the axial width of the annular indentation. If desired, the tubular elements may be connected to one another by means of one or more telescopic or other adjusting means, e.g. screws, so as to vary the distance therebetween according to the axial dimension of the indentation. Alternatively, the two tubular elements may be slidably connected to each other by means of a number of fingers carried by one element and engageable in grooves or slots formed in the other element, with the fingers and slots (or grooves) disposed in use at a sufficient radial distance away from the tubular body so as not to interfere with the formation of the indentation. Further, the support member elements may be in the form of clamps. Such clamps may comprise two semi-annular components which are hinged together to assist in mounting on the tubular body and including means for holding the two components together and clamping them around the tubular body. The said holding means may be a screw, bolt or toggle arrangement. Alternatively, the clamps may be in the form of two rectangular bodies each having a semi-cylindrical groove of diametere equal or slightly greater than the external diameter of the tubular body. The two halves of the clamp may be bolted or otherwise, e.g. by a fluid pressure system, particularly when pressure is applied to the plastic medium by a fluid pressure system, secured to each other and simultaneously clamped around the tubular body.

According to a further aspect of the present invention, a method for forming couplings of ductile metal, or individual sockets thereof, comprises holding substantially the entire periphery of a section of ductile metal tubing in support means, the supporting surface thereof having a cavity formed therein, and applying pressure from within the section of metal tubing to the wall thereof at a location in registration with the cavity, the wall thereby being distended into the cavity, the pressure being provided by means of a plastic filler metal material being extruded through one or more apertures extending through the walls of an open-ended hollow mandrel, the interior of the resulting distension thereby being provided with a deposit of said plastic material.

In more detail, the method of the invention may comprise:

i. inserting into a section of ductile metal tubing a hollow mandrel having a blind end and containing one or more apertures, each aperture extending from the interior of the mandrel to the circumferential surface, the interior of the mandrel containing a plastic filler metal material;

ii. holding at least an end portion of said section of tubing in support means, the end portion containing the mandrel, the said support means having a supporting surface adapted to contact substantially the entire periphery of said end portion and a cavity being provided in said supporting surface, the relative position of the mandrel within said portion of tubing to said support means being such that the apertures are substantially in registration with the cavity; and iii. inserting into the open end of said hollow mandrel a ram to apply pressure to the said plastic filler metal material, thereby to force said material through said apertures to distend that portion of said ductile metal tubing in registration with said cavity into said cavity, the interior of the resulting distension being thereby provided with a deposit of plastic filler metal material.

According to another aspect of the present invention apparatus for producing an indentation containing a plastic medium and opening into an internal wall surface of a tubular body comprises a support member shaped to conform with at least a portion of the external surface of the tubular body in that region thereof backing on to or bounding the region where it is desired to form the indentation and means for applying pressure via the plastic medium to the said region of the internal wall surface of the tubular body to deform the said body, the resulting indentation containing said plastic medium.

Preferably, the said means for applying pressure comprises a conduit for leading plastic medium solely into the said region thereby restricting the application of the pressurised fluid to the said region. Conveniently, this is provided by means of a hollow mandrel for receiving the tubular body, the hollow mandrel having one or more apertures extending through the wall thereof with the external orifice(s) of the aperture(s) capable of being placed in registration with that area of the internal wall surface of the tubular body where the indentation is required, access means for introducing a plastic filler material into the hollow mandrel and pressure means for imparting pressure to so introduced plastic filler material contained in the mandrel to form the indentation by deformation of the tubular body, being provided.

The support member for the tubular body is, in the embodiment wherein it backs onto the region of the tubular body where it is desired to form the indentation, preferably equipped with one or more cavities or recesses for receiving the indentation and, in the embodiment where it bounds the indentation region, is preferably used in combination with a second support member axially spaced apart on the tubular body so that the indentation region lies between them. In the first of said embodiments, the shape and size—i.e. depth—of the indentation is governed by the shape and size of the cavity provided in the support member and, in practice, pressure is applied to plastic solder-paste, for example, in the hollow mandrel and the tubular body is thereby deformed substantially to fill the cavity. According to the second of said embodiments, instead of plastic material under constant pressure, a metered quantity of plastic material, being the amount required for a formed coupling, is forced under pressure through the apertures in the mandrel. On applying pressure, plastic material deforms the wall of the tubular body into the space between the support members and the depth of the resulting indentation is governed by the amount of plastic material delivered. The support member may be in the form of tubular elements, clamps and the like as hereinbefore described.

In order to meter the quantity of plastic material delivered, either the pressurising means may be calibrated or a closable opening may be provided in the wall of the hollow mandrel, the opening exposing a form of breech in the barrel and through which the end of the pressurising means (e.g. a ram) may travel. Plastic material in the form of powder, pellets or billets is then fed to the breech and the amount of material delivered through the mandrel apertures is governed either by the amount fed to the breech or by the swept volume of the breech which may, of course, be adjustable. It is not necessary to use a given breech charge directly in the formation of an indentation; any volume of plastic material can be in train between the breech and the mandrel apertures provided that there are no air gaps. Delivery of a given quantity of material from the breech into the barrel will thus force a corresponding quantity through the apertures at the far end. The pressurising means can then return to its original position allowing the breech to be re-charged.

According to one form of apparatus, the hollow mandrel constitutes an extension of a piston-cylinder combination with the hollow of the mandrel in communication with the cylinder whereby pressure applied therein by movement of the piston is conveyed to plastic filler material contained in the hollow of the mandrel thereby forcing the filler material out through the orifice(s) in the mandrel wall. Conveniently, the cylinder includes a breech for loading the plastic material. The mandrel may be fitted with one or more seals for sealing against the internal wall of the tubular body to prevent escape fo thermoplastic material. In this form of the apparatus of the invention, the mandrel is, in effect, a spigot projecting from the cylinder and, if desired, the cylinder may include an annular recess having an internal cylindrical wall forming a continuation of the mandrel, and into which one end of the tubular body is located. In this case the outer wall or projecting wall of the recess may snugly receive the tubular body and constitute one of the support members. Further, to assist in the actual positioning of the indentation, the said outer wall may project from the base of the recess a distance commensurate with the position it is intended the indentation will ultimately occupy relative to one end of the tubular body.

The pressurising means may be mechanically or hydraulically displaced within the cylinder. Mechanical displacement may be accomplished using a single or multi-start thread between the piston and cylinder. In order to achieve sufficient pressure, the piston may be fitted with a relatively large diameter wheel or handle to provide sufficient mechanical advantage.

Apparatus according to the present invention is particularly useful for forming couplings of ductile metal or individual sockets thereof, of the type described in our British patent application No. 7,912,139, from ductile metal tubing. In more detail, the apparatus may comprise tubing support means adapted to support substantially the entire periphery of at least a portion of tubing, the support means being provided in its supporting surface with a cavity, a hollow open-ended mandrel adapted to be located inside the portion of tubing, the wall of the mandrel having one or more apertures extending therethrough such that the external orifices of the apertures are capable of being placed in registration with, but spaced apart by the wall of the tubing from, the cavity, and means, e.g. a ram, to exert pressure on plastic filler metal material contained in the mandrel.

Preferably:
i. each aperture in the mandrel extends substantially radially from the interior to the circumferential surface and a series of said apertures is arranged so that their external orifices are formed in an essentially annular portion of the said surface;
ii. the cavity provided in the supporting surface of the tubing support means comprises a continuous or discontinuous annual cavity or series of cavities so that the resulting groove in the coupling is itself in the form of a continuous or discontinuous annulus, preferably a peripherally continuous annulus although the arrangement of the said apertures and cavity or cavities may be adapted to provde for other forms of coupling groove, or recess, for example a broken groove or recess or a continuous or discontinuous helix or spiral or a series or a pattern of recesses;
iii. the tubing support means is in two or more parts adapted to co-act in holding the section of tubing containing the mandrel, suitable clamping means being provided; and
iv. where the coupling to be formed is of the type suitable for joining two sections of tubing substantially co-axially and therefore comprises two sockets, each spoket having preferably an essentially annular groove formed in its inner surface and carrying a deposit of plastic filler metal material, the tubing support means includes two essentially annular cavities in spaced-apart relationship and the mandrel includes two series of apertures, each series having their external orifices in separate essentially annular portions of the circumferential surface, the two portions being in essentially the same spaced-apart relationship as the cavities in the tubing support means, and the hollow mandrel has either a blind end with a ram exerting pressure on the plastic filler metal material from the open end or is open-ended with a ram exerting pressure from each end.

Embodiments of apparatus according to the invention will now be described with reference to FIGS. 1 to 5 of the accompanying drawings.

According to FIG. 1, apparatus suitable for forming a coupling for joining two sections of tubing substantially co-axially, the sections having the same nominal external and internal diameters, is shown consisting of means for supporting a section of substantially circular cross-section ductile metal tubing (not shown), said means in this particular embodiment of the invention comprising two solid mild steel sections 1 and 2, section 1 having locating spigots 3 and section 2 having corresponding recesses (not shown), clamping means being provided in the form of four bolts 4 (one only shown). Each of sections 1 and 2 has a supporting surface 5 of substantially semicircular cross-section provided with cavities 6 so that, the two sections 1 and 2 having been clamped together, the two surfaces 5 together provide means to support substantially the entire periphery of at least a portion of said ductile metal tubing and the cavities 6 form two substantially annular cavities in spaced-apart relationship. A hollow mandrel is shown at 7 having a blind end 8 and apertures extending radially from the hollow interior to the circumferential surface thereof, the external orifices of the apertures being shown at 9, the apertures forming two series of apertures, the external orifices of the series being formed in essentially annular portions 10 and 11 of the said circumferential surface and each series having substantially the same spaced-apart relationship as that between the annular cavities in the tubing support means. A ram is provided at 12 for insertion into the open end 13 of said mandrel, the ram having a chuck portion 14 for co-acting with pressing means (not shown) such as a hydraulic press, for example.

In use, the hollow interior of said mandrel is loaded with plastic e.g. thermoplastic, filler metal composition such as a thermoplastic brazing composition as described in our co-pending British patent application No. 36655/78, filed on Sept. 13, 1978 and claiming priority from British patent application No. 38738/77 filed on Sept. 16, 1977, or a thermoplastic soldering composition as described in our co-pending British patent application No. 7,912,209 filed on Apr. 6, 1979. The mandrel is then inserted into a section of ductile metal tubing so that the tubing covers both series of apertures and each end of tubing extends preferably substantially the same distance away from its nearest series of apertures. The tubing and mandrel are then clamped in the support means so that the series of apertures are in registration with, but spaced apart by the wall of the section of metal tubing from, the cavities. This may conveniently be achieved by selecting the longitudinal dimensions of the support means, mandrel and section of tubing so that, when they are all clamped together with the blind end of the mandrel and the corresponding end of the section of tubing being flush with an end portion of the supporting surface of the support means, the series of apertures and the cavities are in registration. Pressure is then applied to the thermoplastic filler metal material via the ram and said material is extruded through said apertures to distend those portions of ductile metal tubing in registration on its inner surface with said apertures and on its outer surface with said cavities into said cavities, the interior of the resulting distensions being thereby provided with a deposit of thermoplastic filler metal composition.

Figure 2:
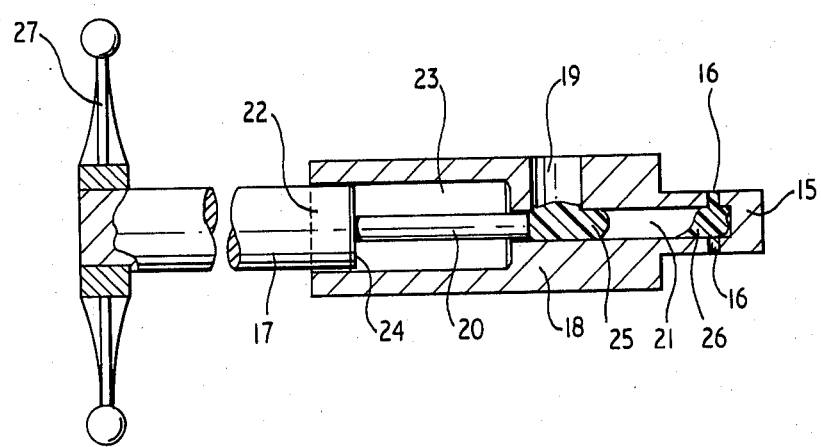
Figure 3:
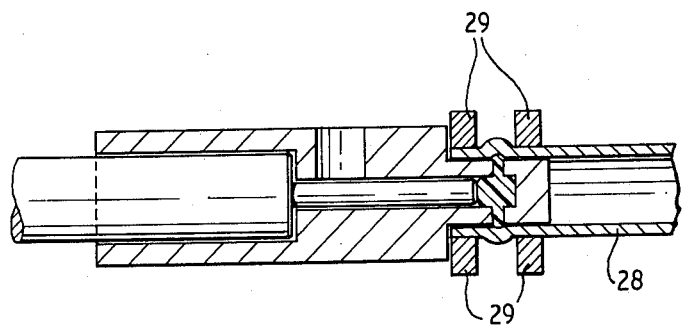

Referring to FIG. 2, apparatus comprising a mandrel with a piston-cylinder combination equipped with a breech is shown in cross-section comprising a hollow mandrel 15 for receiving a tubular body, the hollow mandrel having apertures 16 extending radially through the wall thereof, the mandrel forming an extension of a piston/cylinder combination comprising piston 17 and cylinder wall 18, the hollow of the mandrel being in communication with the cylinder. A breech or opening in the wall of the cylinder at 19 provides access means for introducing a plastic filler material into the cylinder. The piston comprises a first portion 20 having a diameter which renders it a sliding fit in a first portion 21 of the cylinder and a second portion 22 having a larger diameter for travel in enlarged second portion 23 of the cylinder, the resulting annular shoulder at 24 serving to limit the pressurising movement of the piston. A charge of plastic filler material is shown in the cylinder at 25 and the residual portion of a previous charge is shown at 26. In use, the piston is moved into the cylinder (for example by a screw-thread operated by wheel 27) so that the charge 24 is displaced until it contacts previous charge 25. The breech (referring to FIG. 3) is thus closed by the portion 20 of the piston and, as movement of the piston is continued, plastic filler material is forced through the holes 16 to deform and fill the resulting groove in a tubular body 28 previously clamped by means of clamping means 29 around the outside of mandrel 15. When the piston has reached the limit of its travel as determined by shoulder 24 (or, alternatively, when it is decided at an earlier stage that the groove in the tubular body is sufficiently large), the clamps are unfastened and the tubular body removed and the piston is withdrawn to expose the breech in readiness for the following charge. Such an apparatus is eminently suitable for use as a portable tool enabling an engineer to produce indentations on site.

Figure 4:
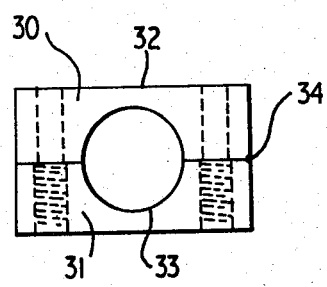

FIG. 4 of the accompanying drawings illustrates in front and side elevation one from of clamping means for the tubular body on the hollow mandrel. The clamping means comprises two sections 30 and 31 each having a hemispherical surface 32 and 33 respectively and optionally hinged together at 34, securing means (e.g. screw-threads and bolts) being provided so that the surfaces when secured together define an annular space for clamping therein a tubular body.

Figure 5:
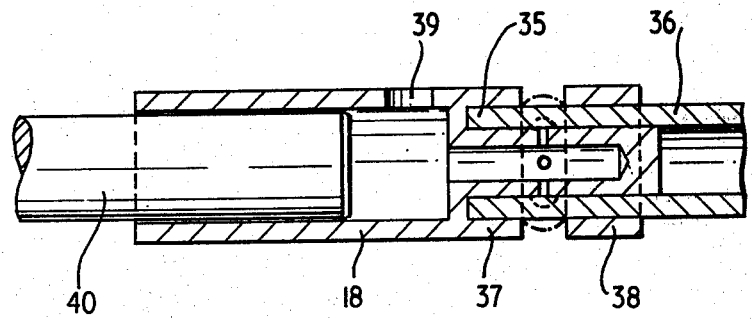

FIG. 5 of the accompanying drawings illustrates a modification of apparatus shown in FIG. 2, whereby the cylinder wall 18 includes an annular recess 35 having an internal cylindrical wall forming a continuation of the mandrel and into which one end of the tubular body 36 is located, the outer or projecting wall of the recess snugly receiving the tubular body and constituting one of the support members 37, the other support member being shown at 38. Furthermore, in the particular embodiment shown in FIG. 5, the piston does not have a first portion for locating in a narrow portion of the cylinder but is of uniform diameter. Consequently, it is necessary to equip the breech 39 with a plug or other closure means to prevent thermoplastic material being forced out of the breech on application of pressure via the piston 40.

Although specific reference is made herein to producing an internal indentation, the method and apparatus may be used in a reverse manner to produce an indentation on the external surface of a tubular body. If desired, the pressure applied to produce the indentation may be assisted by the use of a negative pressure (similar to vacuum forming) applied to the cavity in the support member.

I claim:

1. A method for forming couplings or individual sockets from ductile metal comprising:
   (i) inserting into a section of the ductile metal tubing a hollow mandrel having a blind end and containing one or more apertures, each aperature extending from the interior of the mandrel to the circumferential surface, the interior of the mandrel containing a plastic filler metal material;
   (ii) holding at least an end portion of said section of tubing in support means, the end portion containing the mandrel, the said support means having a supporting surface adapted to contact substantially the entire periphery of said end portion and a cavity being provided in said supporting surface, the relative position of the mandrel within said portion of tubing to said support means being such that the apertures are substantially in registration with the cavity, and (iii) inserting into the open end of said hollow mandrel a ram to apply pressure to the said plastic filler metal material, forcing the said material through said apertures to distend that portion of said ductile metal tubing in registration with said cavity into said cavity, the interior or the resulting distension being thereby simultaneously provided with a deposit of plastic filler metal material.

2. A method for forming a coupling or individual socket of ductile metal tubing comprising providing a rigid supporting surface which is designed to surround the entire periphery of at least a portion of the tubing and which has a cavity therein corresponding to an annular groove or recess to be formed in the interior of the tubing; positioning the tubing in the supporting surface so that the cavity in the supporting surface is located opposite the point where the interior groove or recess is to be formed in the tubing; placing a hollow, apertured mandrel within the thus-positioned tubing so that each aperture therein is located within the tubing at the point where the interior groove or recess is to be formed; and extruding a plastic filler metal material through each said aperture of the mandrel at a pressure such that the thus extruded material forces the tubing into the cavity of the supporting surface to form said interior groove or recess in the tubing while simultaneously depositing in said groove or recess the extruded material, the deposit being such that it may be used to provide on heating a strong and durable joint when the resulting coupling is used to join together two ends of metal tubing.

3. The method of claim 2 wherein after the plastic filler metal material is extruded to form said coupling or socket comprising the groove or recess in the tubing with the deposit of extruded material in the groove or recess, the end of another metal tubing is inserted into the coupling or socket and the resulting composite is heated to melt the filler material and form on cooling a strong and durable joint between the two tubing members.

4. A method according to claim 2 wherein extrusion pressure is applied to the material by a fluid pressure system.

5. A method according to claim 2 wherein extrusion pressure is applied to the plastic material by a mechanical system.

6. A method according to claim 1 wherein the ductile metal comprises copper.

* * * * *